(12) United States Patent
Woller et al.

(10) Patent No.: US 6,182,792 B1
(45) Date of Patent: *Feb. 6, 2001

(54) CLIMBING TREE STAND WITH CABLE ATTACHMENT

(76) Inventors: Ronald R. Woller, 2305 Stratford Rd. SE.; John A. Woller, 2311 College St. SE., both of Decatur, AL (US) 35601

( * ) Notice: Under 35 U.S.C. 154(b), the term of this patent shall be extended for 0 days.

This patent is subject to a terminal disclaimer.

(21) Appl. No.: 09/431,406

(22) Filed: Nov. 1, 1999

Related U.S. Application Data (63) Continuation of application No. 09/191,293, filed on Nov. 13, 1998, now Pat. No. 5,975,242
(60) Provisional application No. 60/071,089, filed on Jan. 9, 1998.

(51) Int. Cl.[7] ............................................ E04G 3/00
(52) U.S. Cl. ............................................. 182/187; 182/135
(58) Field of Search ................................... 182/135, 136, 182/187, 188; 403/353, 3, 4, 294; 24/299, 71 J, 68 CD, 129 A (56) References Cited

U.S. PATENT DOCUMENTS

| | | | |
|---|---|---|---|
| 1,653,092 | * 12/1927 | Draper | 403/353 |
| 5,588,499 | * 12/1996 | Carriere | 182/135 |
| 5,836,061 | * 11/1998 | Castillo et al. | 403/353 X |

* cited by examiner

Primary Examiner—Daniel P. Stodola
Assistant Examiner—Hugh B. Thompson
(74) Attorney, Agent, or Firm—Gardner & Goff, P.C.

(57) ABSTRACT

A climbing tree stand for hunting or other outdoor activity includes a platform and tubular frame members connected thereto and at least partly supporting the platform. A yoke is connected to the platform for engaging the tree and a cable couples the platform to the tree with the ends of the cable carrying a series of nuts securely mounted thereadjacent. Cleats are positioned at the tubular frame members for releasably securing the cable ends using the nuts on the cables. The cleats include keyhole-shaped openings and moveable covers for covering the openings. The yoke includes two sections which are oriented at an acute angle with respect to each other to partly straddle the tree.

22 Claims, 8 Drawing Sheets

CLIMBING TREE STAND WITH CABLE ATTACHMENT

CROSS-REFERENCE TO RELATED APPLICATION

This application is a continuation of U.S. application Ser. No. 09/191,293, filed on Nov. 13, 1998, now U.S. Pat. No. 5,975,242, which claims benefit of U.S. Provisional Application No. 60/071,089, filed on Jan. 9, 1998.

TECHNICAL FIELD

The present invention relates to climbing tree stands for attachment to trees.

BACKGROUND OF THE INVENTION

Outdoorsmen, such as hunters, naturalists, and photographers, often need to gain an elevated vantage point. In this regard, it has been common to use a climbing tree stand to provide a stable platform above the ground and to provide access thereto. Numerous designs involving a variety of construction techniques for climbing tree stands are known.

A common arrangement for a climbing tree stand is a lower platform having an adjustable, rigid backbar which is placed about the tree and secured to the platform for securing the platform to the tree. The rigid backbar often has been made of tubular steel or heavy gauge plate steel. In one such arrangement shown in U.S. Pat. No. 5,316,014 of Amacker, the backbar is rigidly secured to a first pair of steel tubes which are telescopically received in a slightly larger pair of steel tubes, with the position of the backbar then being adjusted by means of a locking pin inserted through the telescoping tubes into holes formed in the inner tube.

In recent years, it has become somewhat common to replace the rigid backbar with a length of cable or a chain in order to reduce weight. One difficulty in the use of cable or chain is that the resulting climbing tree stand often has less than optimal stability. Another problem is that the attachment and adjustment of the cable or chain to the platform can be difficult to accomplish, particularly under adverse conditions (such as in the dark or cold or rain). In this regard, it is pointed out that some of the known prior art climbing tree stands using cables or chains have used square tubing attached to the ends of the cables or chains and telescopically received in other pieces of tubing, as described in the Amacker patent above. Other known prior art arrangements have replaced the square tubing with round tubing, which in addition to requiring axial alignment of the tubes in order to insert the locking pin, further complicates matters by requiring radial alignment as well. This can be very difficult to accomplish in the field.

Accordingly, it can be seen that a need yet remains for a climbing tree stand which is lightweight, stable, easily adjusted, and easily used. It is to the provision of such a climbing tree stand that the present invention is primarily directed.

SUMMARY OF THE INVENTION

Briefly described, in a preferred form the present invention comprises a climbing tree stand for hunting or other outdoor activities. The climbing tree stand includes a platform and at least one tubular frame member connected thereto and at least partly supporting the platform. A yoke is connected to the platform for engaging the tree. A cable couples the platform to the tree, and at least one end of the cable has a series of nuts securely mounted thereadjacent. A cleat is adjacent an end of the at least one tubular frame member for releasably securing one of the nuts of the cable.

Preferably, an opposite end of the cable has another series of nuts securely mounted there-adjacent and there is a second tubular frame member having a cleat for releasably securing the other end of the cable by engaging one of the nuts of the other end.

Preferably, the ends of the cable are captured within the tubular frame members when the nuts are releasably secured to the cleats. Also preferably, the cleats comprise keyhole-shaped openings for receiving a section of the cable with a nut thereon and for avoiding accidental disengagement of the nut from the cleat. Preferably, the nuts comprise ferrules which have been swaged onto the cable.

Preferably, the cleats include safety covers for preventing the cable ends from being accidentally dislodged from the cleats. Preferably, the safety covers can be moved from a position covering the keyhole-shaped openings to a position uncovering the openings.

Preferably, the tubular frame members are oriented at an angle with respect to the platform. Also preferably, the yoke is adapted to at least partly straddle the tree and has scalloped, tree-engaging faces to resist slippage.

In another preferred form, the present invention comprises a climbing tree stand for use with the tree including a platform and a plurality of tubular frame members connected to the platform for supporting the platform adjacent a tree. The climbing tree stand further includes a cable and first and second cable retention cleats mounted to the tubular frame members for releasably retaining the cable. The cable retention cleats each include an opening for receiving an end of the cable therein. A movable cover is positioned adjacent the opening for covering and uncovering the opening such that when the opening is uncovered, the cable can be inserted into and removed from the cleat. With an opening covered, the cable is prevented from becoming accidentally disengaged or dislodged from the cleats.

In another preferred form, the invention comprises a climbing tree stand for use with a tree which includes a platform and at least one tubular frame member connected to the platform for at least partly supporting the platform next to a tree. A tree-engaging yoke is connected to the platform and comprises first and second section which are oriented at a non-zero acute angle with respect to one another.

The climbing tree stand according to the invention has numerous advantages. For example, the use of the cable helps to minimize weight and makes it easier to carry. Moreover, the use of the nuts formed on the cable together with the cleats makes it easy to attach and use the climbing tree stand on a tree. Also, the keyhole-shaped openings in the cleats and the safety covers make the engagement of the cleats with the nuts of the cable very stable, reliable, and fool-proof. The use of the cleats and a series of nuts on the ends of the cable also makes the climbing tree stand very easy to adjust, initially or as one ascends the tree (the diameter of the tree, of course, decreases as one climbs). Moreover, the resulting tree stand is very stable and has no projecting parts to snag clothing or equipment. Moreover, because the cables are captured within the tubular frame members, there is little likelihood that they can get caught on something during the ascent and then suddenly release, resulting in a loud noise, as often occurs with prior art designs. Also, the resulting climbing tree stand is extremely stable, even as the user's weight shifts around on the platform.

Accordingly, it is a primary object of the present invention to provide a climbing tree seat which is economical to manufacture, durable in use, and highly effective.

It is another object of the present invention to provide a climbing tree stand which is lightweight.

It is another object of the present invention to provide a climbing tree stand which can be easily operated, even in low light or other adverse conditions.

It is another object of the present invention to provide a climbing tree stand which is simple in its construction and is easily adjusted.

It is another object of the present invention to provide a climbing tree stand which is stable in use.

It is another object of the present invention to provide a climbing tree stand which is quiet in use and during transport.

These and other objects, features, and advantages of the present invention will become more apparent upon reading the following specification in conjunction with the accompanying drawing figures.

DETAILED DESCRIPTION OF THE PREFERRED EMBODIMENTS

Figure 1:
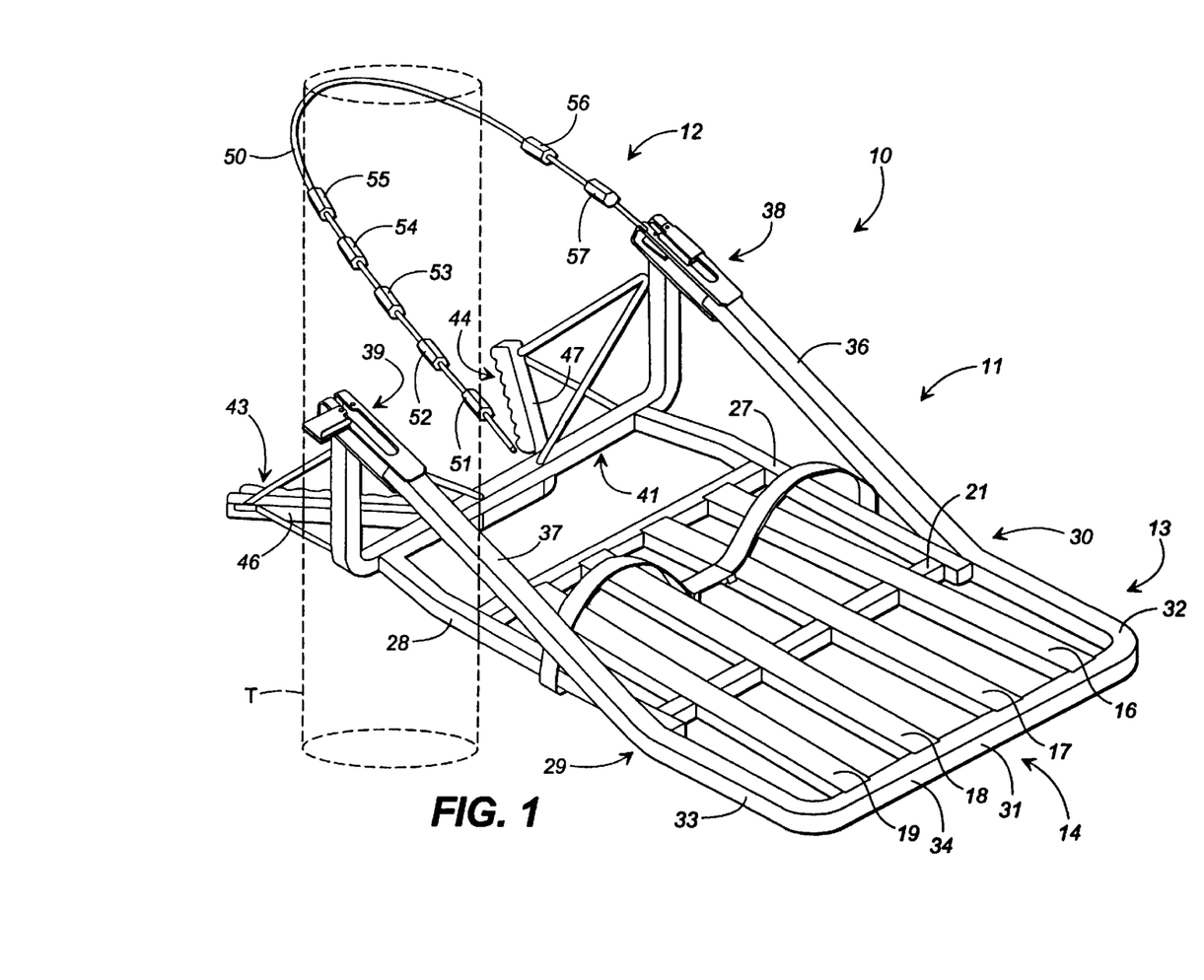
FIG. 1 is a perspective illustration of a climbing tree stand according to a preferred form of the invention, shown in conjunction with a tree trunk.

Referring now in detail to the drawing figures, wherein like reference numerals represent like parts throughout the several views, FIGS. 1–4 show the climbing tree stand 10 according to a preferred form of the invention. The climbing tree stand 10 is shown in FIG. 1 in use with a tree trunk T. However, those skilled in the art will readily recognize that the climbing tree stand can be used with poles, such as utility poles, as well. Also, while the climbing tree stand 10 is shown by itself, those skilled in the art will recognize that the tree stand will often be used in conjunction with a tree seat to facilitate the user's climbing of the tree and the comfortable use of the stand over prolonged periods of time.

As shown in FIGS. 1–4, the climbing tree stand 10 includes a rigid platform structure indicated at 11 and a cable attachment indicated at 12. The rigid platform structure 11 includes a platform assembly indicated at 13. The platform assembly 13 includes a peripheral frame assembly 14 and a series of slats, such as slats 16–19. Extending beneath the slats and between the outer-most sides of the peripheral frame assembly 14 is a cross-beam 21.

The peripheral frame assembly 14 also includes side frame members 27 and 28, as well as a generally U-shaped platform frame 31. The side frames 27 and 28 are welded to the U-shaped platform frame 31 in the vicinity of regions 29 and 30.

Figure 4:
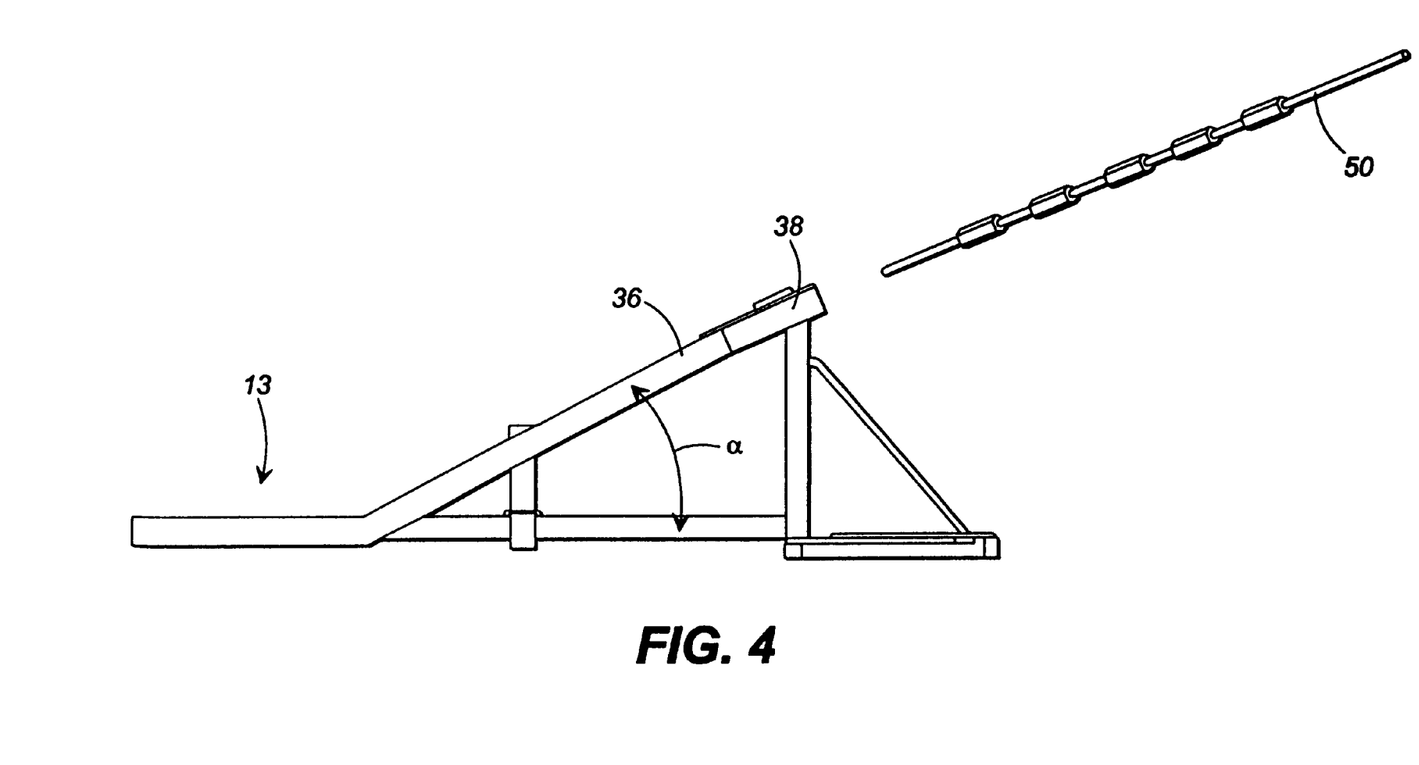

The U-shaped platform frame 31 includes three portions which lie in the plane of the platform assembly 13, namely portions 32, 33, and 34. Moreover, the U-shaped platform frame 31 also includes two upwardly angled portions 36 and 37 for supporting the platform assembly adjacent a tree and for attachment to the cable attachment 12. As best seen in FIGS. 4 and 1, the angled portions 36, 37 are oriented at an acute angle $\alpha$ with respect to the remainder of the platform assembly 13. Preferably, the angle $\alpha$ is between about 10° and 40° and most preferably is about 26° or so. While 26° has been found to work very well, other angles will work also. At the ends of the upwardly angled portions 36 and 37 cable retention cleats 38 and 39 are formed, which will be described in more detail below. The cable retention cleats 38, 39 can also be described as soltted clasps or sockets.

A U-shaped vertical frame 41 extends between the side frames 27 and 28 and the cable retention cleats 38 and 39 of the upwardly angled portions 36 and 37 of the U-shaped platform frame 31. A generally V-shaped yoke 42 is positioned beneath the U-shaped vertical frame 41, is welded thereto, and faces away from the platform assembly 13. The yoke 42 is adapted for at least partly straddling the tree and will be described in more detail below.

The frame components just described are made from 18 gauge steel tubing, $^{13}/_{16}"$ inches square. The individual pieces thereof are welded together and then powder coated (painted) to avoid corrosion.

Referring again to the generally V-shaped yoke 42 of FIG. 1, the yoke includes tubular sections 46 and 47. Preferably, the inside faces 43 and 44 of the tubular sections 46, 47 are provided with a scalloped sill to help grip the tree and to avoid slippage in use.

Figure 2:
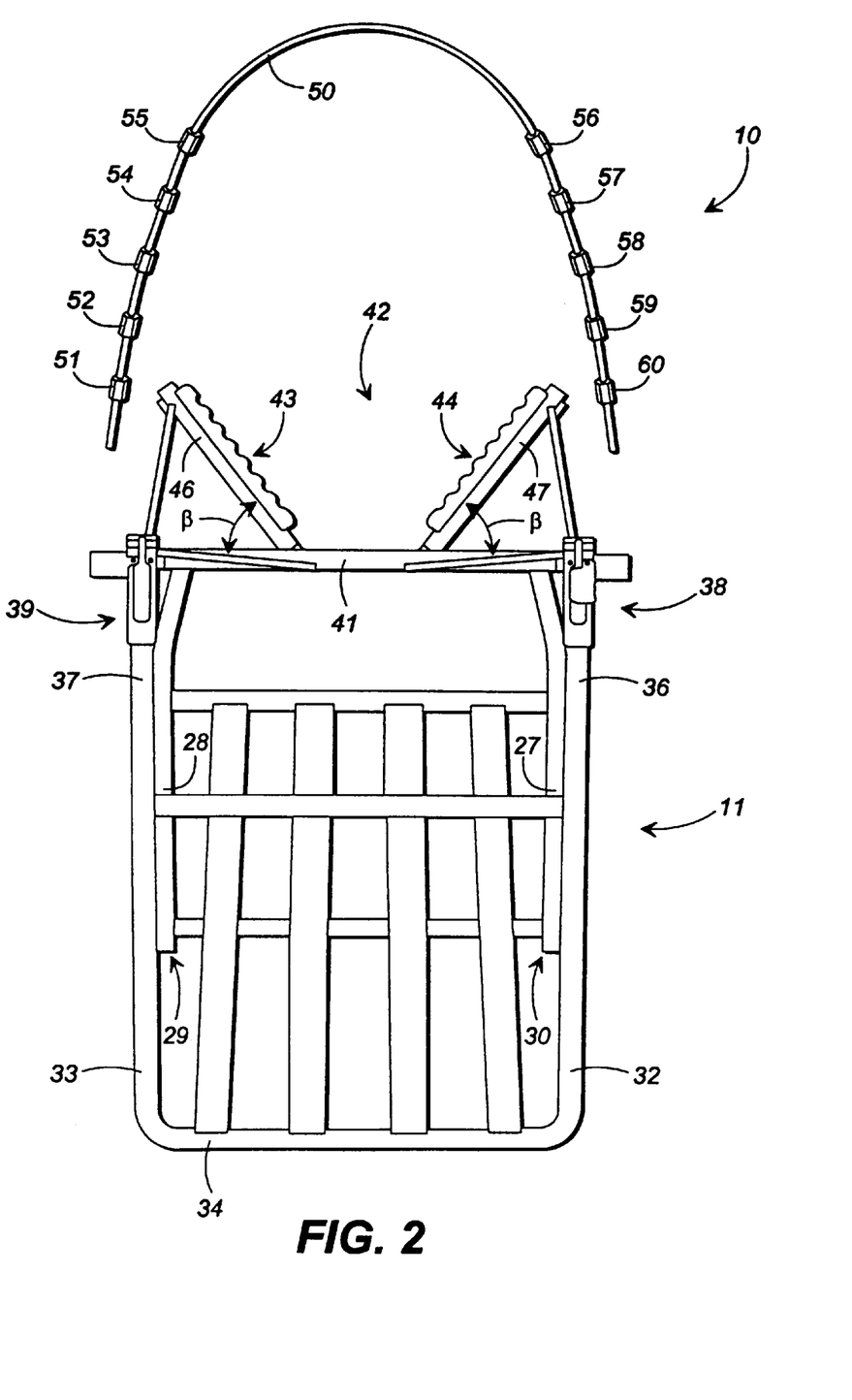
FIGS. 2–4 are plan, front, and side views, respectively, of the climbing tree stand of FIG. 1.
Figure 3:
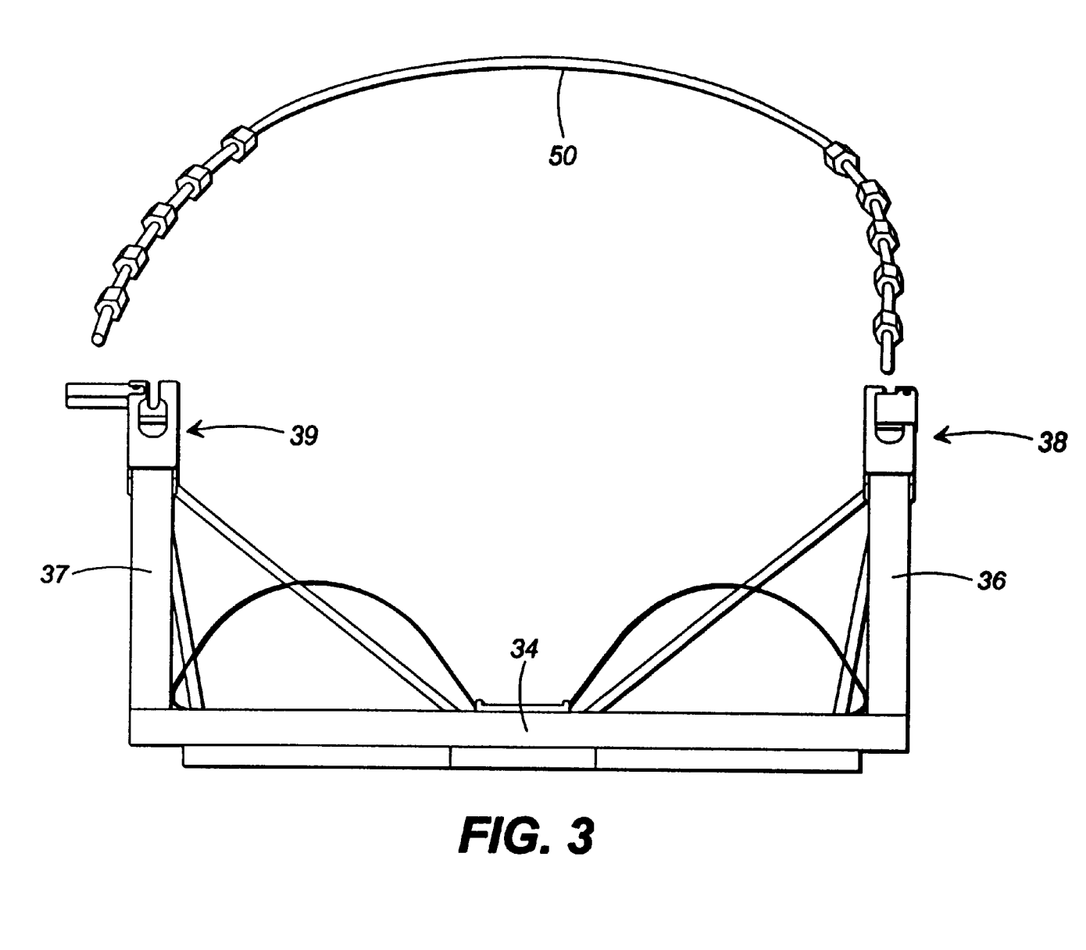

Having now described the basic structure of the platform itself, attention is directed to the cable attachment 12. For clarity of illustration, FIG. 1 depicts one end of the cable retained by cleat 38 while the other end of the cable is shown loose. The cable attachment 12 includes a cable 50 adapted to be looped about a tree and further includes a series of cylindrical nuts (collars) formed on the cable at the ends thereof. The nuts (or sleeves), such as nuts 51 60 shown in FIG. 1 and FIG. 2 are in the form of cylindrical ferrules that have been swaged onto the cable 50. Of course, those skilled in the art will recognize that other shapes for the nuts can be employed as well. For example, the nuts could be spherical or box-shaped. The cylindrically-shaped nuts provide good strength at a reasonable cost.

The cable 50 has an overall length of about 65" which is useful for accommodating trees having diameters from 8" to slightly more than 20". Each end of the cable includes five nuts (only two of which are shown on one end in FIG. 1, the other three being hidden inside the cleat 38). The first nut at each end of the cable is preferably 4" from the very end of the cable, and the remaining nuts are spaced 3" apart. Thus, the first nut is 4" from the end, the next nut along the cable is 3" from the first, the third nut is 3" from the second, and so on. The 3" spacing between nuts provides a good adjustment increment to accommodate different size trees (with one 3" increment between adjacent nuts corresponding to roughly a 1" diameter change in the tree diameter). Also, by having the end nuts set back 4" from the ends of the cable 50, this ensures that (in conjunction with the shape and configuration of the cable retention cleats 38 and 39) the ends of the cable remain shrouded within the tubular members 36 and 37. Cable 50 preferably is a 1 by 19, ¼" cable (that is, it is made up of a single bundle of 19 strands having a ¼" overall diameter). Such a cable has an ultimate breaking strength of about 8200 pounds, which is more than sufficient (and includes a generous safety factor) for the loads typically placed on such a tree stand by a user.

Figure 5:
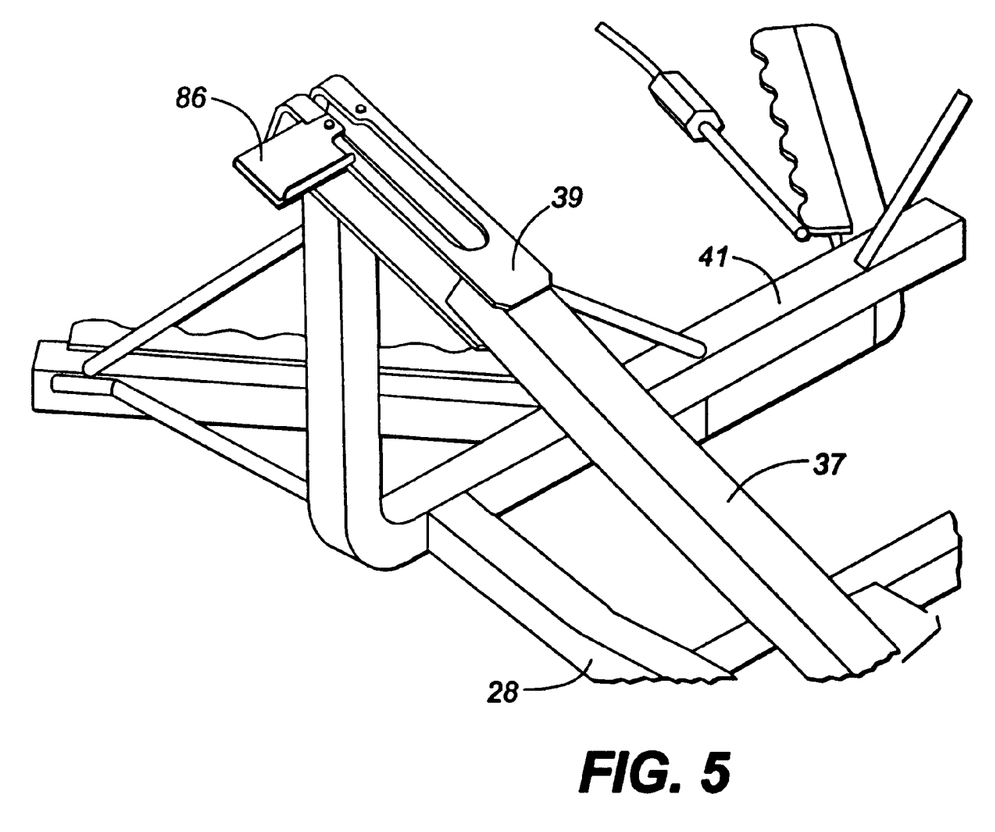
FIGS. 5–7 are detailed, perspective illustrations of a portion of the cable attachment of FIG. 1.
Figure 6:
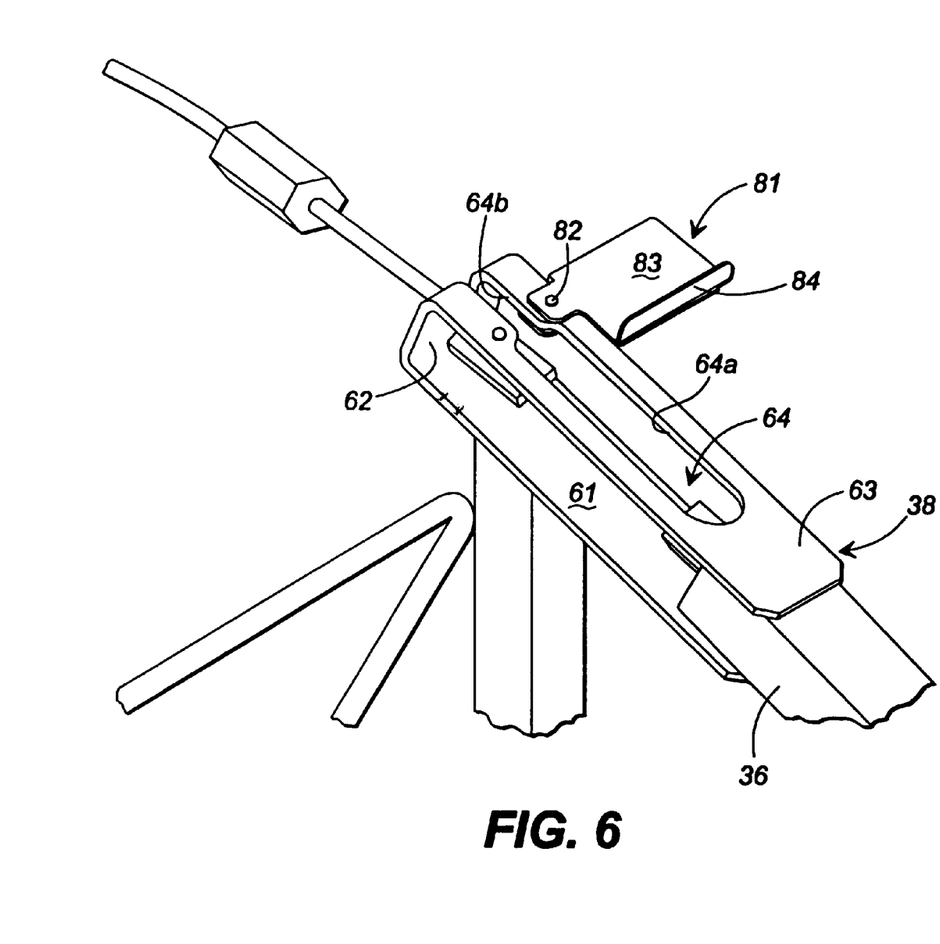

As can be seen best in FIGS. 5 and 6, the cable retention cleats 38 and 39 are generally U-shaped straps which are welded onto the ends of the tubular frame members 36 and 37 and aligned therewith. As best seen in FIG. 6, the straps that form the cable retention cleats include a bottom panel 61, a front panel 62, and a top panel 63. As can be seen in the figures, the sides of the cable retention cleats are open. The top panel 63 includes a generally bottle-shaped opening or keyhole-shaped opening 64 formed therein for receiving a section of cable with one or more cable nuts thereon. The bottle-shaped opening 64 includes a wide part 64a and a narrow part 64b. The wide part 64a is wide enough to accommodate the cable nuts, while the narrow part 64b is wide enough to accommodate only the cable, but will not allow the cable nuts to pass therethrough. The narrow part 64b extends not only to the edge of the top panel 63, but around the corner and down the front panel 62. With this construction, a section of cable with a cable nut thereon can be inserted into the bottle-shaped opening with the cable slipping through the narrow portion of the front panel and the cable nut slipping through the broader portion of the opening. Once tension is applied to the cable, the nut is pulled fast against the inside face of the front panel 62 and is held securely. Note that in such an insance, the narrow opening in the front panel prevents the cable nut from being pulled through and the narrow opening 64b in the top panel prevents the cable nut from slipping upwardly. Thus, the cable is securely held.

Figure 7:
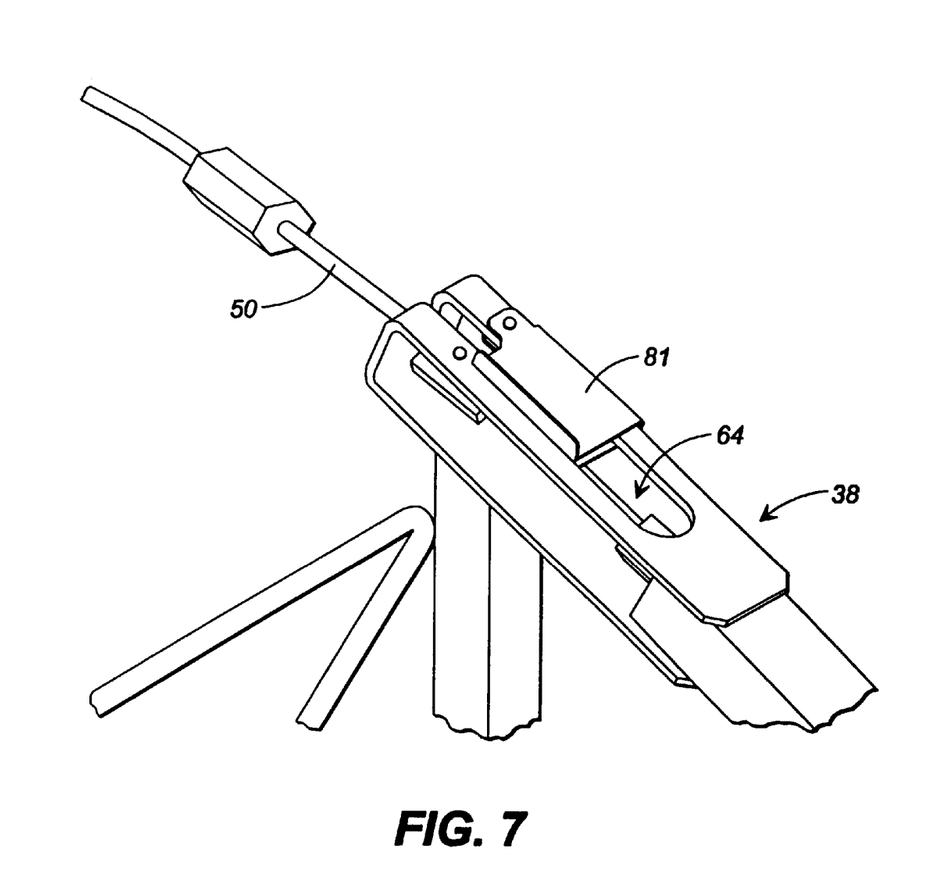

The cleat 38 also includes a moveable cover 81 for covering and uncovering the opening 64. The cover 81 is pivoted about a pivot pin 82. Cover 81 includes a flat upper portion 83 and an upright portion 84 which acts as a thumb catch to allow one to easily move the movable cover back and forth. With the cover in its open position shown in FIG. 6, the cable 50 can be removed from the cleat by slipping it forwardly farther into the tubular member 36 to move the cable nut to the wide part of the opening whereupon the cable can be lifted upwardly and then pulled out. Conversely, with the cover 81 in its closed position (see FIG. 1) the cable is prevented from coming up out through the keyhole-shaped opening. This provides greatly improved safety in use by preventing the cable from becoming completely disconnected from the cleat as one goes up or down the tree using the stand. As shown in FIG. 5, the left hand cleat 39 includes its own pivoting cover 86. As best seen in FIG. 5, the covers each include an upper and lower panel which together straddle the top panels of the cleats for a more secure construction. For a more detailed view of one of the cleats in its closed position, the reader is referred to FIG. 7 in which cover 81 is shown covering (at least partly covering) the opening 64 to prevent cable 50 from inadvertently becoming dislodged from the cleat 38. In this regard, it should be pointed out that it is not essential that the cover completely cover the opening. Rather, what is important is that the cover merely bridge the opening to prevent the cable from slipping therethrough.

While the cable retention cleats 38, 39 are shown with the keyhole-shaped openings facing up, the keyhole-shaped openings could be oriented to face in other directions, including facing out and facing in (toward each other). This has the potential of eliminating the movable covers or, if the movable covers are retained, further increasing the safety and reliability of the cable attachment.

Referring now again to FIG. 2, some other aspects of the platform and frame assembly will be considered. As shown in FIG. 2, the V-shaped yoke 42 includes first and second tubular sections 46 and 47, each of which is oriented at an angle $\beta$ of 56° with respect to the U-shaped vertical frame 41. As a result, the included angle between the tubular sections 46 and 47 is 68°. It has been found that this angle is particularly effective for engaging a tree and results in the yoke at least partly straddling the tree over a wide range of diameters, including trees having diameters between about 8" and slightly more than 20". Applicants have also found that an included angle of 72° works very well too.

Figure 8:
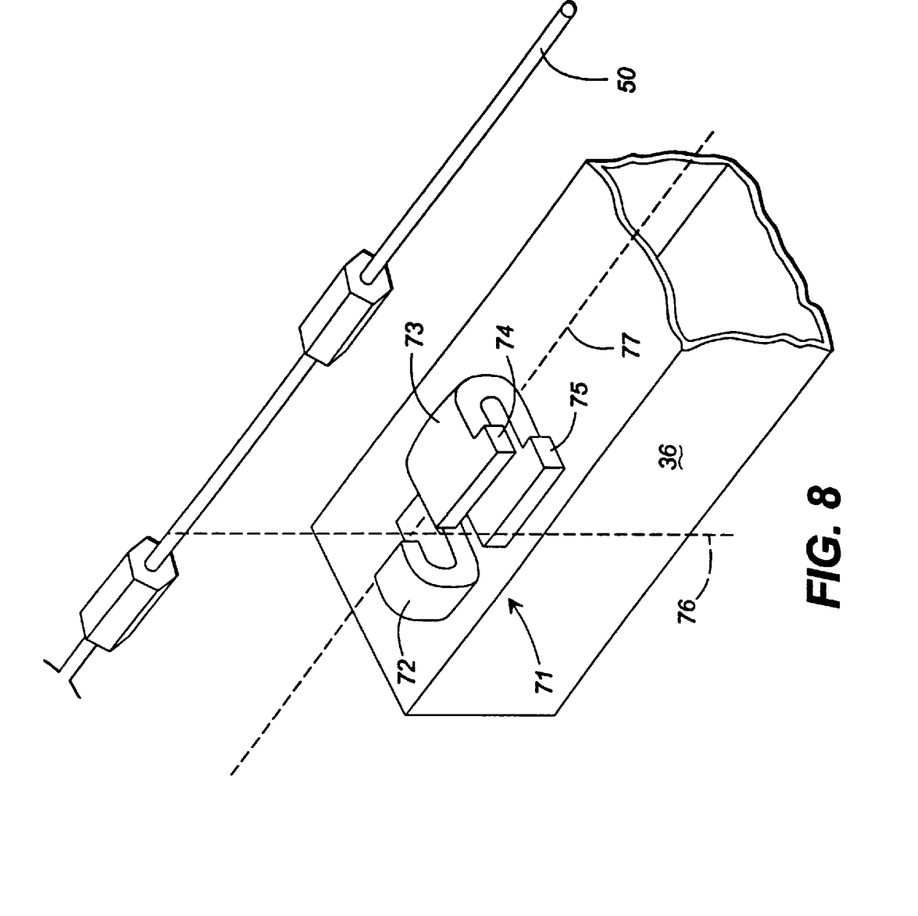
FIG. 8 is a perspective, detailed illustration of a modified form of a portion of the climbing tree stand of FIG. 1, showing a modified cleat arrangement.

FIG. 8 shows an alternate embodiment in which the cleats 38 and 39 are replaced with a different style cleat, shown here as cleat 71. This cleat is welded to the outside of the tubular members, such as tubular member 36. The cleat 71 includes two or more half-cylindrical (U-shaped) clips which face in opposite directions, such as clips 72 and 73. Notice that clip 73 includes retaining shoulders 74 and 75 to prevent the cable nut from inadvertently slipping loose. The half-cylindrical openings in the clips 72 and 73 are large enough to admit the cable, but too small to admit the cable nuts. To place a cable and cable nut in the cleat 71, one turns the cable (or at least a portion thereof) to the direction of direction axis 76 and pushes the cable downwardly into the opening between the cleat clips. One then rotates the cable back to the direction of direction axis 77. Once tension is applied on the cable 50, one of the cable nuts is pulled back against the face of the cleat and held securely in place.

The climbing tree stand according to the invention has numerous advantages. Firstly, the use of a cable greatly reduces the weight of the climbing tree stand. By eliminating the tubular metal backbar and the attendant hardware associated with connecting it to the platform, a weight savings of more than 7 pounds can be achieved by using the cable and the cable retention cleats. This greatly improves the portability and the ease of climbing with the climbing tree stand. Also, a climbing tree stand according to the invention allows for a very simple, reliable, and easily accomplished connection of the cable with the cable retention cleats. This is in stark contrast to the known prior art arrangements which require careful alignment (some require axial alignment, while others require both axial alignment and radial alignment) of an opening within a tube in order to receive a locking pin therethrough to secure the cable. Also, the climbing tree stand according to the invention is extremely stable and quiet. It also presents a very uncluttered structure, leaving fewer things on which one might snag clothing, equipment, foliage, etc.

The invention provides unparalleled platform stability while using a flexible cable, band, or chain. In this regard, the acute angle of the yoke causes the transverse or lateral reactions (forces) to be greater than the longitudinal reactions (i.e., the side-gripping forces exceed the front-gripping forces). Moreover, the present invention allows for an attachment to the tree with no pins, bolts, knobs, or other locking devices prior to using the invention. The simplicity of the invention allows it to be used in low-light situations reliably. Moreover, there are no loose parts to drop on the ground.

The acute angle of the tree-engaging yoke allows a free span of cable between the cable retention cleats and the contact point of the tree. This free span allows the vertical separation between the contact points of the cable and the engagement yoke to be varied, thereby changing the pitch of the tree stand platform.

While the invention has been shown and described in preferred forms, it will be apparent to those skilled in the art that many modifications, additions, and deletions can be made therein. For example, one end of the cable could be permanently mounted to the tubing and the quantity of nuts on the other end could be increased. Also, the cable could be replaced with solid wire or with chain. These and other changes can be made without departing from the spirit and scope of the invention as set forth in the following claims.

What is claimed is:

1. A climbing tree stand for use with a tree and comprising:
    a platform;
    a plurality of tubular frame members connected to said platform for supporting said platform adjacent a tree, said tubularframe members being arranged at a non-zero angle with respect to said platform and at least one of said tubular frame members having a cable retention clasp having a slot;
    engagement means connected to said platform for engaging the tree;
    a cable with a series of nuts fixedly positioned adjacent at least one end of said cable for releasable retention by said at least one cable retention clasp, with said at least one end of said cable being received within the interior of said tubular frame members; and
    wherein with a load placed on said climbing tree stand said cable is secured by one of said nuts being pulled fast against said at least one cable retention clasp.

2. A climbing tree stand as claimed in claim 1 wherein said engagement means comprises a yoke adapted for substantially straddling the tree, and wherein said yoke includes first and second tree-engaging sections oriented at an acute angle with respect to one another.

3. A climbing tree stand as claimed in claim 2 wherein said acute angle is greater than about 50°.

4. A climbing tree stand as claimed in claim 2 wherein said acute angle is about 70°.

5. A climbing tree stand as claimed in claim 1 wherein said nuts comprise cylindrical ferrules swaged onto said cable.

6. A climbing tree stand as claimed in claim 1 wherein said at least one cable retention clasp comprises a keyhole-shaped opening for receiving a section of said cable with a nut and for avoiding accidental disengagement of said nut from said at least one cable retention clasp.

7. A climbing tree stand as claimed in claim 6 wherein said at least one cable retention clasp is oriented so that with said climbing tree stand attached to a tree said at least one cable retention clasp faces generally upwardly.

8. A climbing tree stand as claimed in claim 1 further comprising at least one movable cover mounted to said at least one cable retention clasp for preventing said cable from becoming accidentally dislodged from said at least one cable retention clasp.

9. A climbing tree stand for use with a tree and comprising:
    a platform;
    at least one tubular frame member connected to and at least partly supporting said platform adjacent the tree;
    a yoke connected to said platform for engaging the tree;
    a flexible lanyard for coupling said platform to the tree, at least one end of said flexible lanyard having a series of nuts securely mounted fixedly thereto; and
    a lanyard retention joint adjacent said at least one tubular frame member for releasably securing one of said nuts of said flexible lanyard and having a slot formed therein for receiving a portion of said flexible lanyard therethrough;
    wherein with a load placed on said climbing tree stand said lanyard can be secured by one of said nuts being pulled fast against said lanyard retention joint.

10. A climbing tree stand as claimed in claim 9 wherein an opposite end of said lanyard has another series of nuts securely mounted thereto and said lanyard comprises a cable.

11. A climbing tree stand as claimed in claim 10 further comprising a second tubular frame member and a second lanyard retention joint for releasably securing another nut adjacent an opposite end of said cable.

12. A climbing tree stand as claimed in claim 11 wherein said ends of said cable are captured within said tubular frame members.

13. A climbing tree stand as claimed in claim 11 wherein said tubular frame members are oriented at an angle relative to said platform.

14. A climbing tree stand as claimed in claim 11 wherein said lanyard retention joints each comprise a keyhole-shaped opening for receiving a section of said cable with a nut thereon and for avoiding accidental disengagement of said nuts.

15. A climbing tree stand as claimed in claim 14 further comprising movable covers mounted to said lanyard retention joints for preventing accidental disengagement of said cable from said lanyard retention joints.

16. A climbing tree stand as claimed in claim 9 wherein said at least one end of said flexible lanyard is captured within said at least one tubular frame member when one of said nuts is releasably secured by said lanyard retention joint.

17. A climbing tree stand as claimed in claim 9 wherein said lanyard retention joint comprises a keyhole-shaped opening for receiving a section of said cable with a nut and for avoiding accidental disengagement of said nut from said lanyard retention joint.

18. A climbing tree stand as claimed in claim 17 wherein said lanyard retention joint is flexibly oriented so that said keyhole-shaped opening faces up with said climbing tree stand attached to a tree.

19. A climbing tree stand as claimed in claim 9 wherein said nuts comprise cylindrical ferrules swaged onto said cable.

20. A climbing tree stand as claimed in claim 9 wherein said lanyard retention joint comprises a pair of generally c-shaped members spaced apart from one another and facing in different directions.

21. A climbing tree stand as claimed in claim 9 wherein said lanyard retention joint comprises at least one pair of opposite-opening spaced-apart members.

22. A climbing tree stand for use with a tree and comprising:
    a platform;
    at least one frame member connected to and at least partly supporting said platform adjacent the tree;
    a yoke connected to said platform for engaging the tree;
    a cable for coupling said platform to the tree, at least one end of said cable having a series of nuts securely mounted fixedly thereto; and
    a cable retention joint adjacent said at least one frame member for releasably securing at least one of said nuts of said cable, said cable retention joint having at least one pair of opposite-opening spaced-apart members each having a channel formed therein for receiving a portion of said at least one end of said cable therethrough, wherein with a load placed on said climbing tree stand said cable can be secured by at least one of said nuts being pulled fast against at least one of said opposite-opening spaced-apart members.

* * * * *